Jan. 17, 1939.      C. ANDERSON      2,143,852
INTERLOCKING SPIRAL REINFORCING WRAPPING FOR HOSE
Filed Dec. 12, 1935
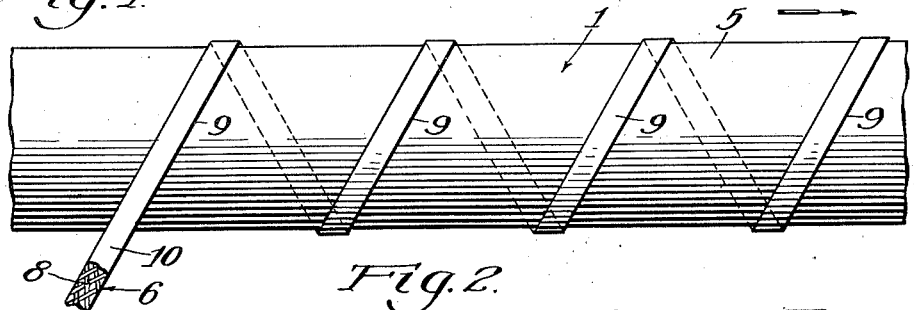
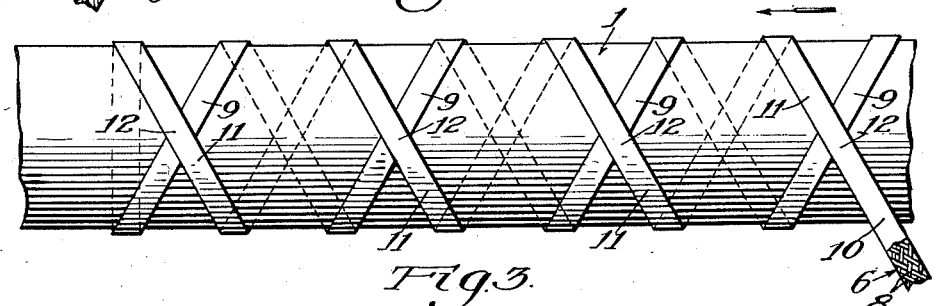
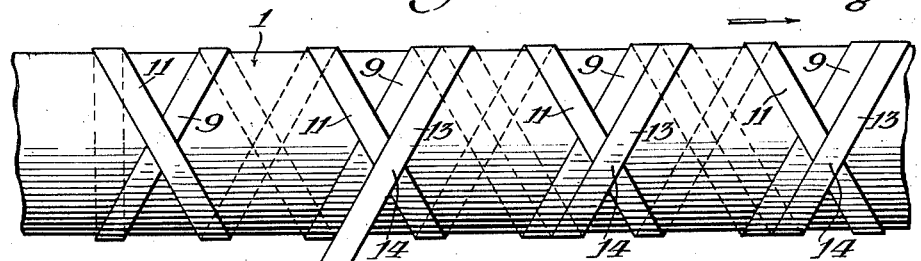
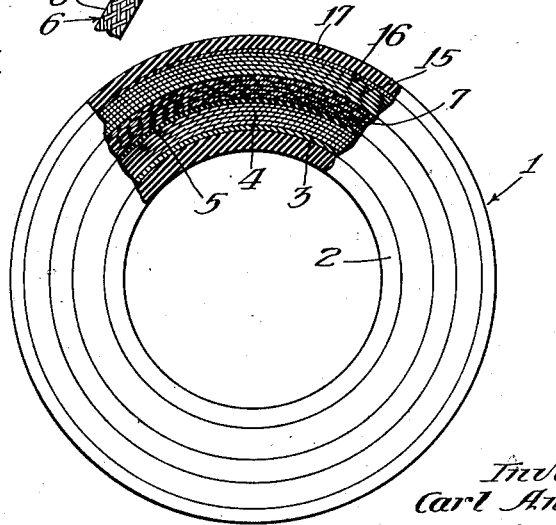
Inventor:
Carl Anderson,
By: Lee J. Gary
Attorney Patented Jan. 17, 1939

2,143,852

UNITED STATES PATENT OFFICE 2,143,852

INTERLOCKING SPIRAL REINFORCING WRAPPING FOR HOSE

Carl Anderson, Passaic, N. J., assignor to Raybestos-Manhattan, Inc., Bridgeport, Conn., a corporation of New Jersey Application December 12, 1935, Serial No. 54,021

5 Claims. (Cl. 154—8)

This invention relates to improvements in hose used for high pressures and a method of constructing such hose, and refers specifically to a hose construction comprising two or more interlocking spirally wrapped metal layers and a method of wrapping said layers.

In the manufacture of hose adapted to be used for conveying fluids under relatively high pressures, it is desirable that one or more of the layers comprising the hose be constructed of metal. The metal layer usually takes the form of a wound flat metal ribbon or a ribbon of braided bead wires. To construct the metal layer the metal ribbon has heretofore been wound upon the hose in the form of a continuous spiral or helix with the coils of the spiral or helix disposed adjacent or slightly spaced from each other.

Therefore, in constructing metal reinforced high pressure hose, for instance, hose capable of withstanding pressures in the neighborhood of 2,000 pounds per square inch or thereabouts, progressively wound helical reinforcing metal ribbons have been used almost entirely. This type of hose, although capable of withstanding severe pressures, possesses the inherent defects of excessive longitudinal expansion and excessive twist when subjected to pressures unless extreme care is exercised in the process of manufacture. This is due primarily to the fact that the adjacent coils of the reinforcing metal ribbon are not secured or "tied" to each other and hence tend to expand coil-spring-wise and simultaneously rotate when a force is exerted longitudinally thereon. This results in difficult handling of the hose during use and also is conducive to chafing and ply-separation. In other words, the metal ribbon layers may act as the source or start of a cumulative deteriorating action which causes the hose to fail prematurely.

In my invention, the benefits of strength and durability characteristic of metal ribbon layers are obtained and in addition the benefits of interlocked or interwound adjacent spiral loops will also be obtained by a method which is commercially feasible and economical.

My invention, briefly described, comprises winding metal ribbon, preferably braided bead wire ribbon, helically upon a tube, the adjacent loops of the spiral being spaced from each other a distance at least equal to the width of the ribbon and preferably a greater distance, a multiple of the width of the ribbon. The spiral ribbon is wrapped in the manner, above described, until a desired length of the tube is wrapped. The tube is then spirally wrapped in the opposite direction with the same coil spacing to the end of the first wrapping. The direction of wrap is again reversed and the adjacent coils of the helix similarly spaced but the coils are laid adjacent the edges of the first-wrapped helix. This operation is continued in the reverse direction and repeated until the entire cycle is completed, at which time the entire tube surface will be covered with two layers of ribbon, substantially each coil of the forwardly traveling helix being "tied" by a coil of the next succeeding backwardly traveling helix.

The method described above constitutes the elementary procedure, namely, where but one ribbon is applied. It is to be understood, of course, that my invention contemplates the simultaneous application of one or more ribbons, each ribbon being applied to a predetermined section of the hose in the manner described hereinbefore.

Other objects and advantages of my invention will be apparent from the accompanying drawing and following detailed description.

In the drawing, Fig. 1 is a fragmentary side elevational view of a tube upon which one pass of metal ribbon has been applied.

Fig. 2 is a similar view illustrating the first reverse pass of the ribbon.

Fig. 3 is a similar view illustrating the second forward pass of the ribbon.

Fig. 4 is an end elevation, partly in section of the finished hose.

Referring in detail to the drawing, 1 indicates a tube which may comprise a partially built hose. The tube 1 may comprise an inner rubber tube 2 over which is applied a ply 3 of frictioned Cider cloth. A plurality of plies 4 of frictioned duck, cut on the bias, may embrace the ply 3 and a ply 5 of relatively soft rubber covers the duck plies 4. This structure constitutes tube 1 and serves as the base upon which the metal ribbon layer is wrapped, as will be hereinafter more fully described.

For purposes of illustration the metal ribbon 6 which constitutes the metallic layers 7 comprises bead wire 8 braided in a relatively flat ribbon-like form. The ribbon 6 is initially wrapped in helical fashion in one direction upon the hose tube 5, as shown best in Fig. 1, the adjacent coils 9 being spaced along the axis of the tube a distance at least equal to the width of the ribbon and preferably a greater distance, an integral multiple of the width of the ribbon. For purposes of description, the tube 1 will be considered as being rotated at a predetermined angular velocity and also moved axially in the direction of the arrow at a predetermined translative speed, the point of feed being maintained stationary. It can readily be seen that, by changing the ratio of the angular velocity to the speed of translation a desired spacing of adjacent coils or pitch may be obtained. Simultaneously with the wrapping of the ribbon 6 upon the tube, a rubber strip 10 substantially equal in width to the width of the ribbon may be wrapped upon the tube, the strip being carried upon the top of the ribbon 6. The purpose of the strip 10 will be hereinafter more fully described.

When a desired length of the tube 1 has been wrapped, the axial motion of the tube is reversed and the coils 11 wrapped upon the tube at a pitch oppositely inclined to the pitch of the coils 9. The strip 10 is carried upon the ribbon 6 during this reverse operation or, if desired, the strip 10 may be carried under the ribbon. By this method of wrapping a plurality of diamond-shaped areas 12 upon the tube 1 are covered with two plies of ribbon with two or more interposed plies of rubber. The two plies of metal ribbon are thus separated from each other by a plurality of layers of rubber which serves as a cushion, and tend to prevent axial movement of one metal ply relatively to the other, reducing the possibility of chafing and ply separation. Further, such construction renders the hose somewhat more flexible than when two metal plies are disposed one upon the other.

Again the direction of axial travel of the tube is reversed and coils 13 are wrapped upon the tube, the edges of the coils 13 and coils 9 being disposed closely adjacent each other. In this manner an additional plurality of double-covered diamond-shaped areas 14 are provided upon tube 1. The operation of reversing the axial direction of travel of the tube 1 is continued until the entire area of tube 1 is covered by two plies of ribbon and two or more plies of rubber at which time the cycle of operation is complete, the number of reversals depending upon the ratio of the width of the ribbon to the spacing of adjacent coils of each helix. Of course, the complete cycle may be repeated as many times as desired to provide the desired number of metal ribbon plies.

After completing the metal ribbon layer 7 a plurality of plies of frictioned duck 15, a ply of cider cloth 16 and a rubber cover 17 may complete the hose. It is to be understood that the manner of assembly of the elements of the hose with the exception of the metal ribbon plies, and interposed rubber plies may be changed as desired, since my invention is specifically directed to the method of application of the metal ribbon.

It can readily be seen that the layer 7 serves as an ideal reinforcing member since radial stresses are resisted by the coils of ribbon in a manner similar to that offered by the usual helically wound reinforcing metal ribbons, and in addition each coil of each helix overlaps and is interlocked with the respective coils of the next succeeding reversely wound helix. This latter feature contributes materially to longitudinal strength and also tends to eliminate torsion or twist of the hose during use and also eliminates elastic fatigue of the wires constituting the ribbon.

It is to be understood, of course, that the layer 7 may be wrapped by using two metal ribbons which may be simultaneously helically wrapped in opposite directions. In this case, the tube would be rotated but not moved longitudinally but the ribbon feeding means would move parallel to the tube 1 in opposite directions over the desired length of the tube. If desired, one or more ribbons may be helically wrapped simultaneously in the same direction upon separate portions of a predetermined length of the tube. In this case, the ribbon feeding means (one or more) may be maintained stationary and the tube may be moved longitudinally back and forth a distance equal to the strength of the separate portions.

By the use of the term "layer" as applied to the reinforcing member is meant, two or more plies of metal ribbon. By the use of the term "ply" as applied to the reinforcing member is meant, a unit radial thickness of metal ribbon. By the use of the expression "metal ribbon" is meant, an elongated relatively flexible metal member such as a solid or perforated metal band, braided bead wire in flat form or merely the usual curvilinear or polygon sectioned wire.

I claim as my invention:

1. A method of constructing a metal reinforcing layer for a hose adapted to be used for high pressure fluid which comprises, wrapping a relatively flat metal ribbon upon the foundation plies of a predetermined length of hose in the form of a helix having adjacent coils spaced from each other, wrapping a relatively flat metal ribbon in the reverse direction upon said predetermined length of hose to form a helix with spaced adjacent coils pitched in a direction opposite to the pitch of the first mentioned helix, wrapping a relatively flat metal ribbon upon said predetermined length of hose in the form of a helix pitched in the same direction as said first mentioned helix having adjacent coils disposed in edge abutting relationship with the coils of said first mentioned helix, and repeating said wrapping action back and forth over said predetermined length of hose until the hose area included in said length is completely covered by metal ribbon, the coils of each successive oppositely pitched wrapping intersecting the coils of the preceding oppositely pitched wrappings and overlying them at the points of intersection.

2. A method of wrapping a relatively flat metal ribbon upon a hose comprising rubber and fabric for high pressure use to provide a reinforcing layer upon the hose comprising, wrapping said metal ribbon in one direction upon the foundation plies of a predetermined length of a hose in the form of a helix having adjacent coils spaced from each other, reversing the direction of wrap of the ribbon to form a helix with spaced adjacent coils pitched in a direction opposite to the pitch of the first mentioned helix, said second helix traversing said predetermined length of hose in the opposite direction the coils thereof intersecting the coils of said first helix and lying thereover at the intersections, again wrapping said ribbon upon said predetermined length of hose in helical form in the first mentioned direction and disposing the edges of the coils of said last mentioned helix closely adjacent the edges of the coils of said first mentioned helix, and repeating said wrapping action back and forth over said predetermined length of hose until the hose area included in said length is completely covered by said ribbon.

3. A method of constructing a metal reinforcing layer for a hose adapted to be used for high pressure fluid which comprises, wrapping a relatively flat metal ribbon comprising essentially braided bead wire upon the foundation plies of a predetermined length of hose in the form of a helix having adjacent coils spaced from each other, wrapping a relatively flat metal ribbon comprising essentially braided bead wire in the reverse direction upon said predetermined length of hose to form a helix with spaced adjacent coils pitched in a direction opposite to the pitch of the first mentioned helix, wrapping a relatively flat metal ribbon comprising essentially braided bead wire upon said predetermined length of hose in the form of a helix pitched in the same direction as said first mentioned helix having adjacent coils disposed in edge abutting relationship with the coils of said first mentioned helix, and repeating said wrapping action back and forth over said predetermined length of hose until the hose area included in said length is completely covered by metal ribbon, the coils of each successive oppositely pitched wrapping intersecting the coils of the preceding oppositely pitched wrappings and overlying them at the points of intersection.

4. A method of constructing a metal reinforcing layer for a hose adapted to be used for high pressure fluid which comprises, wrapping a relatively flat metal ribbon in company with a flexible strip upon the foundation plies of a predetermined length of hose in the form of a helix having adjacent coils spaced from each other, wrapping a relatively flat metal ribbon in company with a flexible strip in the reverse direction upon said predetermined length of hose to form a helix with spaced adjacent coils pitched in a direction opposite to the pitch of the first mentioned helix, wrapping a relatively flat metal ribbon in company with a flexible strip upon said predetermined length of hose in the form of a helix pitched in the same direction as said first mentioned helix having adjacent coils disposed in edge abutting relationship with the coils of said first mentioned helix, and repeating said wrapping action back and forth over said predetermined length of hose until the hose area included in said length is completely covered by metal ribbon, the coils of each successively oppositely pitched wrapping intersection the coils of the preceding oppositely pitched wrappings and overlying them at the points of intersection.

5. A method of constructing a metal reinforcing layer for a hose adapted to be used for high pressure fluid which comprises, wrapping a relatively flat metal ribbon upon the foundation plies of a predetermined length of hose in the form of a helix having adjacent coils spaced from each other a distance equal to the width of one or a multiple of the width of the ribbon, wrapping a relatively flat metal ribbon in the reverse direction upon said predetermined length of hose to form a helix with spaced adjacent coils pitched in a direction opposite to the pitch of the first mentioned helix, the coils being spaced a distance equal to the width of one or a multiple of the width of the ribbon, wrapping a relatively flat metal ribbon upon said predetermined length of hose in the form of a helix pitched in the same direction as said first mentioned helix having adjacent coils disposed in edge abutting relationship with the coils of said first mentioned helix, and repeating said wrapping action back and forth over said predetermined length of hose until the hose area included in said length is completely covered by metal ribbon, the coils of each successive oppositely pitched wrapping intersecting the coils of the preceding oppositely pitched wrappings and overlying them at the points of intersection.

CARL ANDERSON.